Aug. 21, 1956 R. F. HERR 2,759,530
APPARATUS FOR TENSIONING WIRE SPOKES ON WHEELS
Filed March 15, 1951 7 Sheets-Sheet 1

INVENTOR.
RICHARD F. HERR
BY
ATTORNEY

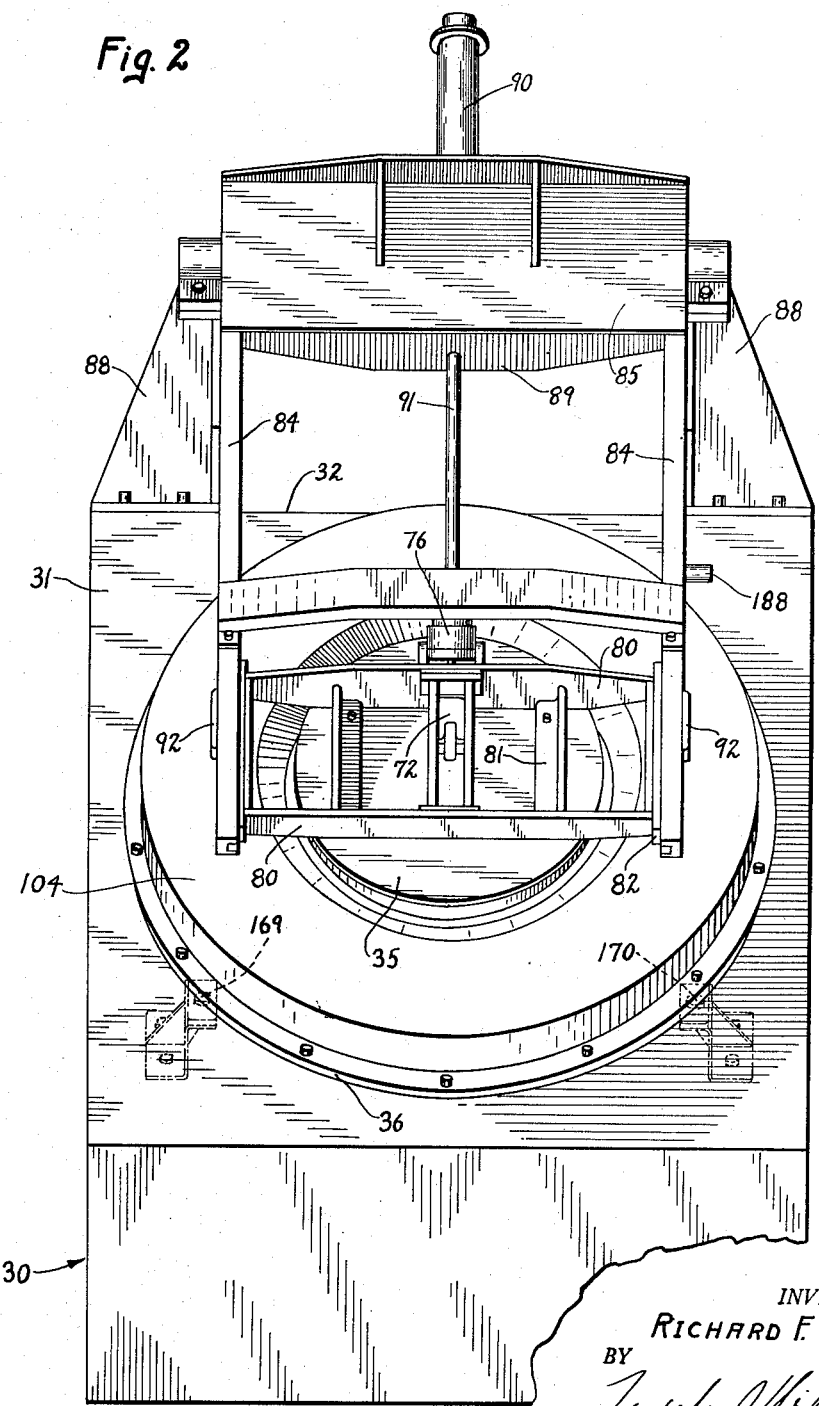

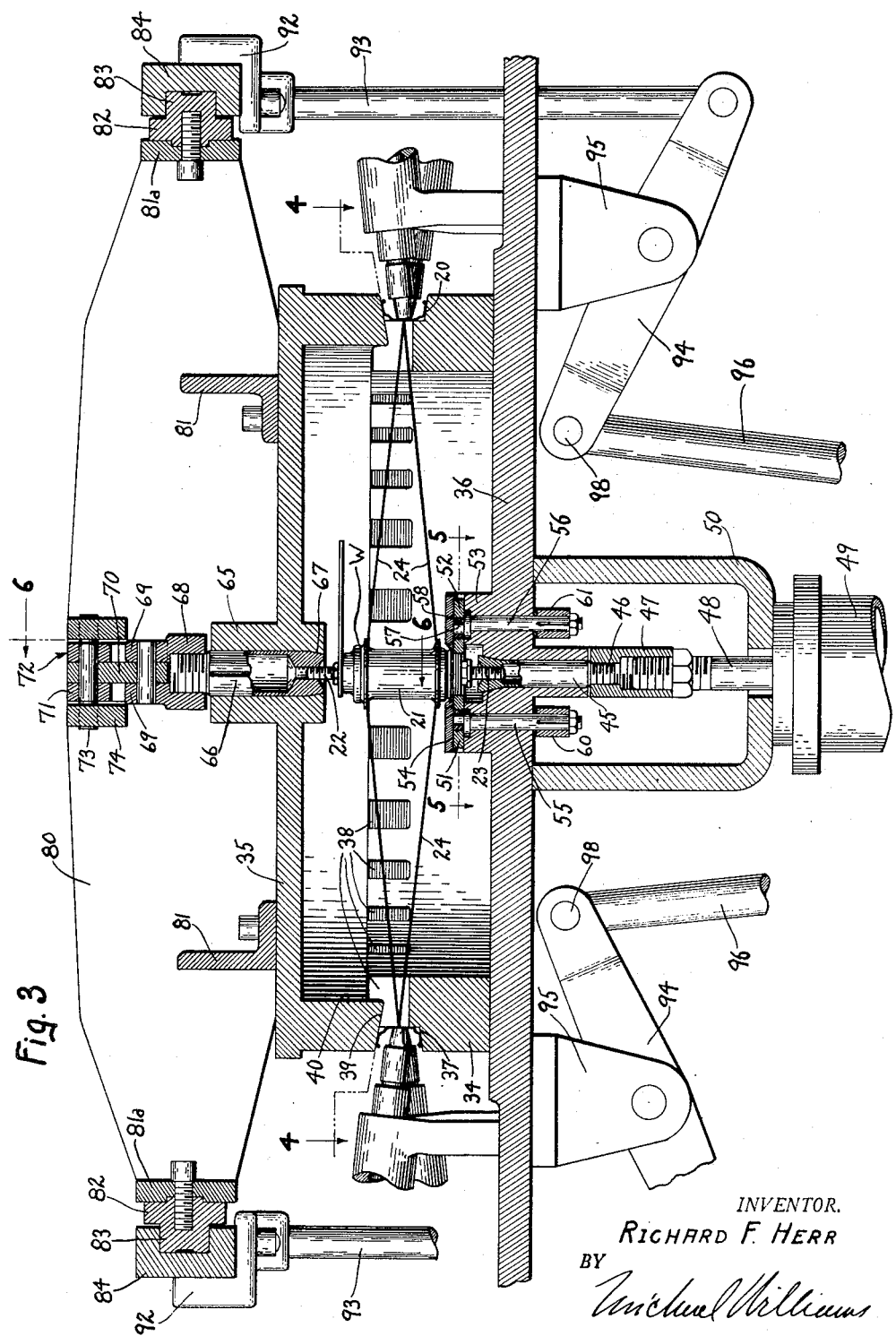

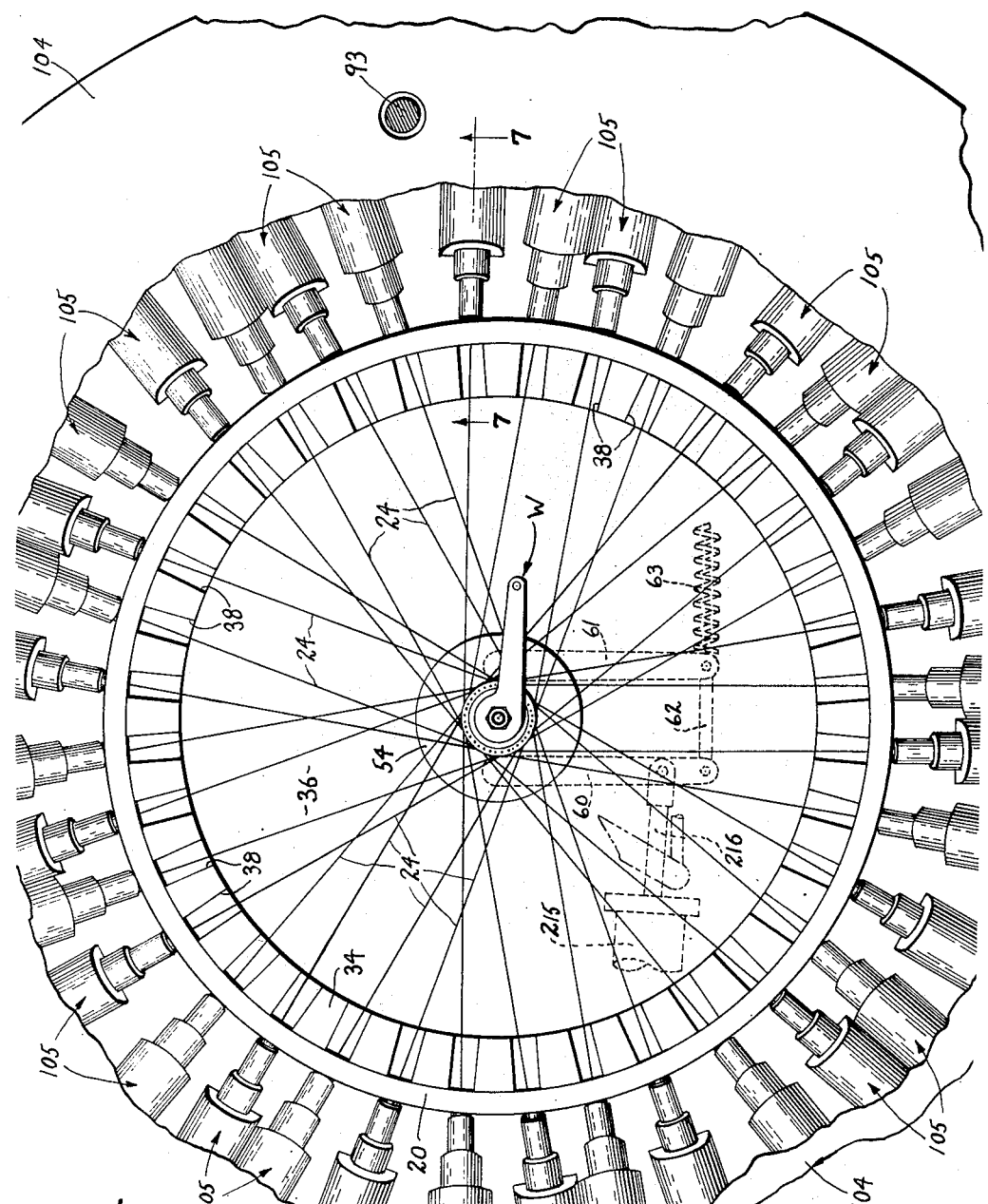

Aug. 21, 1956  R. F. HERR  2,759,530
APPARATUS FOR TENSIONING WIRE SPOKES ON WHEELS
Filed March 15, 1951  7 Sheets-Sheet 5
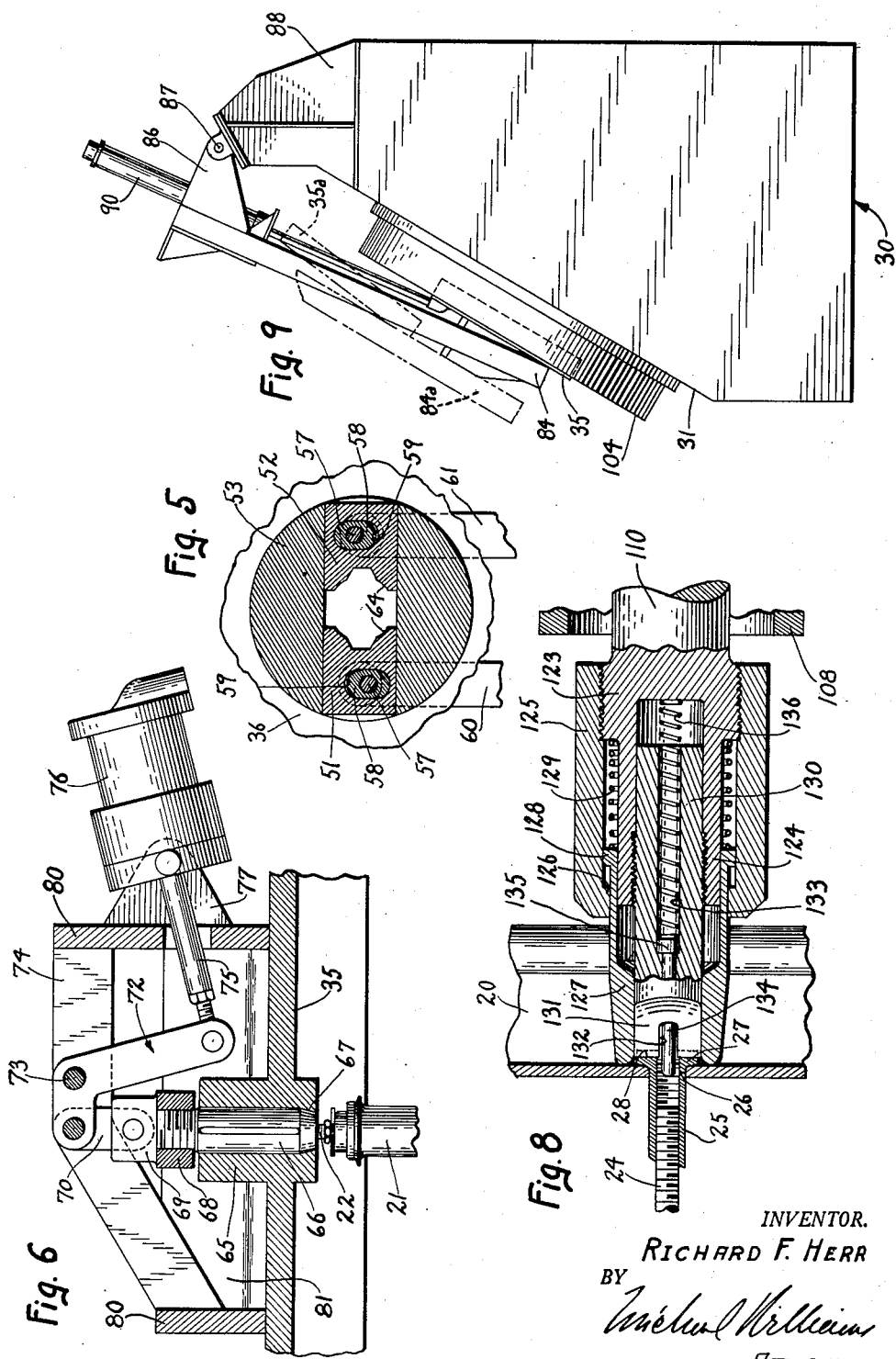
INVENTOR.
RICHARD F. HERR
BY
ATTORNEY

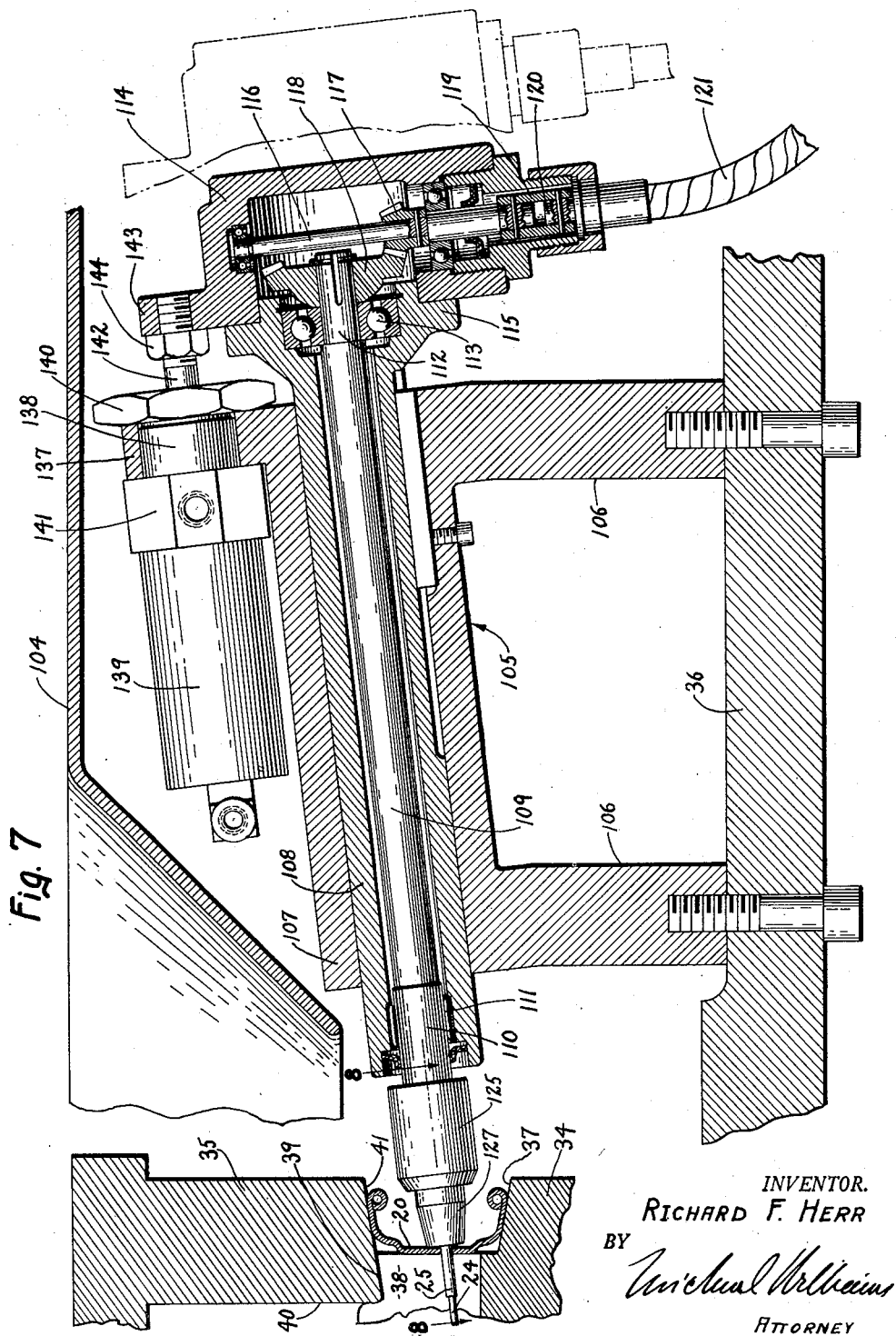

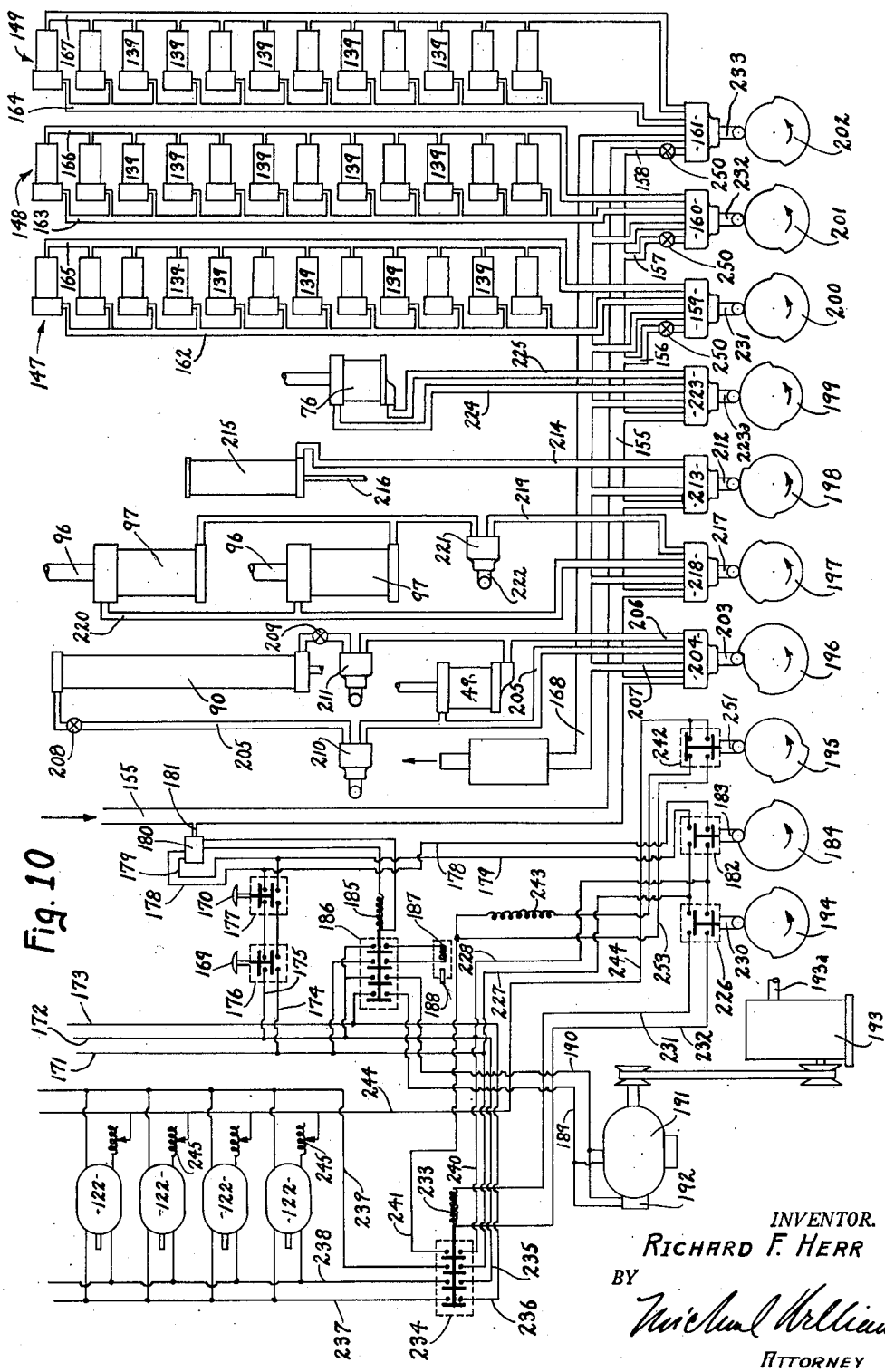

United States Patent Office 2,759,530
Patented Aug. 21, 1956

2,759,530

APPARATUS FOR TENSIONING WIRE SPOKES ON WHEELS

Richard F. Herr, Warren, Ohio, assignor, by mesne assignments, to The Herr Equipment Corporation, Warren, Ohio, a corporation of Ohio Application March 15, 1951, Serial No. 215,684

1 Claim. (Cl. 157—1.5)

My invention relates to methods of and apparatus for operation on wheels, particularly to methods of and means for tensioning the spokes of spoked wheels, and the principal object of my invention is to provide new and improved methods and means of such character.

My invention is particularly adapted for use with bicycle wheels and provides methods and means whereby wheel spokes may be trued and tensioned accurately and in mass production with a minimum of labor.

In the drawings accompanying this specification and forming a part of this application, there is shown, for purposes of illustration, an embodiment which my invention may assume, and in these drawings:

Figure 2 is a front elevational view of the apparatus shown in Figure 1,

Figure 1:
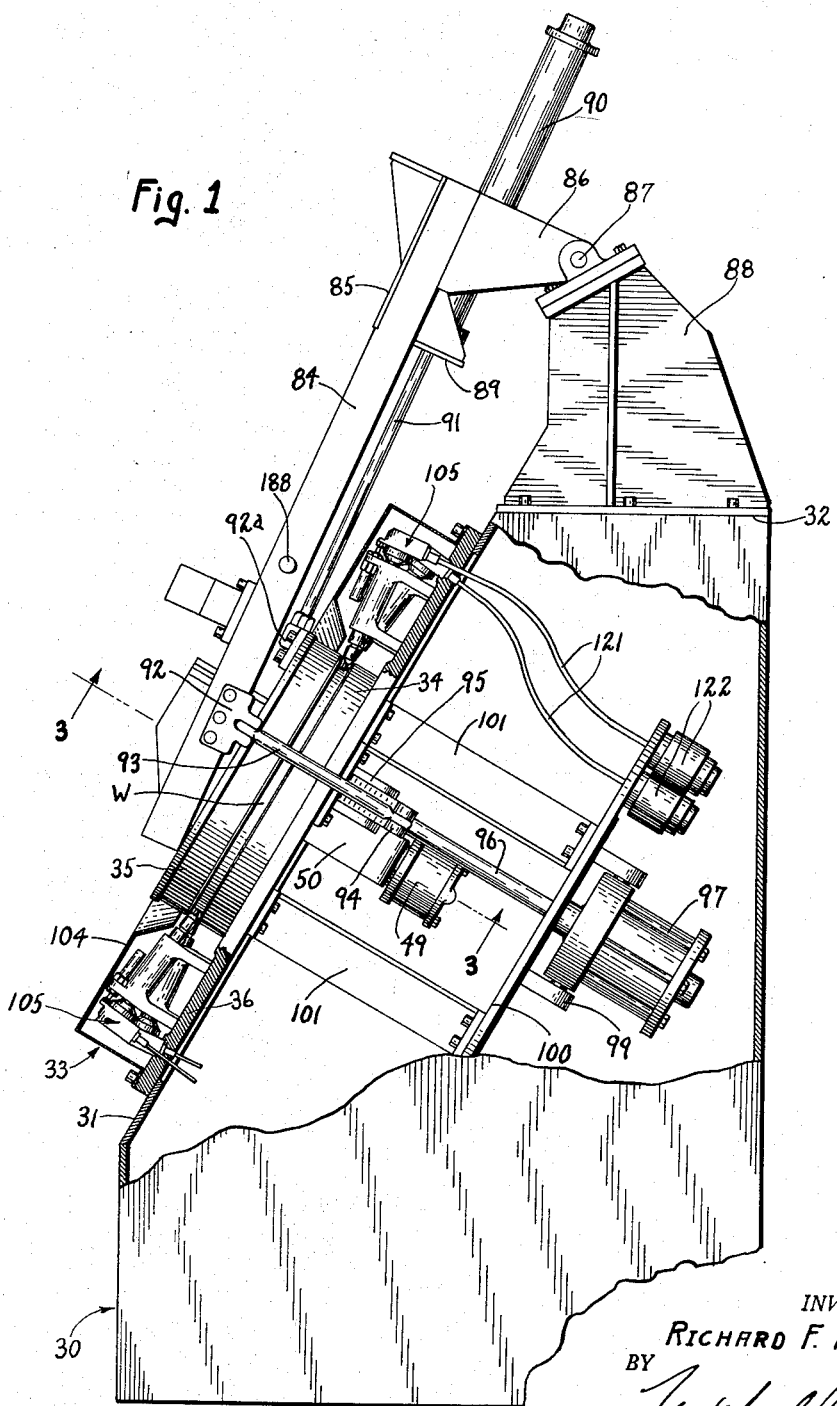
Figure 1 is a side elevational view of apparatus disclosing an embodiment of my invention, parts being broken away to better illustrate the construction.

Figure 3 is an enlarged fragmentary sectional view corresponding generally to the line 3—3 of Figure 1, Figure 4 is a fragmentary sectional view corresponding generally to the line 4—4 of Figure 3, Figure 5 is a transverse sectional view, drawn to larger scale, corresponding generally to the line 5—5 of Figure 3, Figure 6 is an enlarged fragmentary sectional view corresponding generally to the line 6—6 of Figure 3, Figure 7 is an enlarged fragmentary sectional view corresponding generally to the line 7—7 of Figure 4, Figure 8 is an enlarged fragmentary sectional view corresponding generally to the line 8—8 of Figure 7, Figure 9 is a side elevational view similar to Figure 1, but in a reduced scale, showing parts in different position, and Figure 10 is a diagrammatic view showing piping and electrical connections.

With reference to the drawings, the embodiment of the invention herein disclosed is particularly adapted for use with a bicycle wheel W (see especially Figures 3 and 4) although it will be appreciated that my invention is not limited to such use. As herein shown, the wheel W comprises a rim 20, a hub 21 having an axle extending therethrough, opposite ends 22, 23 of the axle extending outwardly of the hub 21. A plurality of spokes 24 join the rim 20 and the hub 21, and each spoke has a portion adapted for tensioning of such spoke. In usual bicycle wheel construction, each spoke has one end connected to the hub 21 and has its opposite end threaded, as best seen in Figure 8. An interiorly threaded sleeve 25 engages the threaded end of the spoke, passes through an aperture 26 in the rim 20, and terminates in a head 27. Each head is formed with a screw-driver slot 28 and heretofore such slot provided means for engagement with a screw-driver blade, or like turning device, providing for manual rotation of the sleeve 25 and tensioning of the respective spoke. The usual bicycle rim is of the drop-center type and therefore such rim is generally of U-shaped cross-section as herein shown.

In ordinary assembly of bicycle wheels, an operator threads the spokes through apertures in the hub and loosely connects the threaded end of each spoke with a respective sleeve 25. Thereafter, another operator, or the same operator, performs the laborious task of individually tensioning each spoke until the spokes are properly tensioned and the rim and hub are properly positioned relative to each other. Even with extremely skilled operators this truing operation is time consuming and therefore very costly.

The apparatus herein disclosed is adapted to operate on a wheel W after the rim and hub have been generally loosely connected by means of the spokes. The apparatus is preferably of automatic operation so that an operator is only required to place a wheel between parts of a clamping jig and effect operation of the apparatus, whereby the apparatus will then automatically clamp the rim and hub, will engage all of the spokes and substantially simultaneously tension them to a predetermined value, will separate the jig parts so that the wheel may be removed, and then stop, thus providing for cyclic operation of the apparatus, each cycle producing a completed and accurately assembled wheel ready for use.

In the enclosed embodiment, a generally upright base 30 (see Figure 1) is provided for support of the operating mechanism, the base having an inclined front wall 31 and a top wall 32. A wheel clamping jig 33 is accessible from the front wall 31 and this wall is inclined sufficiently so that an operator may position a wheel into and remove a wheel from the clamping jig without undue effort.

The clamping jig 33 is here shown as formed of two parts 34 and 35, the part 34 being carried by a plate 36 which is bolted to the inclined front wall 31. As best seen in Figures 3 and 7, the jig part 34 is formed as an annular body having a groove 37 in its peripheral wall for closely receiving the wheel rim 20. The free face of the jig part 34 is formed with inwardly extending slots 38 in number equal to the spokes for the purpose of passing the spokes. The peripheral portion of the free face of the jig part 34 is formed with an inwardly inclined undercut ledge 39 to engage and accurately position an annular wall 40 of the jig part 35, the latter being assembleable or disassembleable with respect to the jig part 34 and is formed with an inclined wall 41 mating with the ledge 39. The inclined wall 41 of the jig part 35 is adapted to engage a peripheral surface of the rim 20, whereby the rim is securely and accurately held in position within the clamping jig 33.

Each of the jig parts 34, 35 is provided with means engageable with the wheel hub 21 for the purpose of accurately aligning and centering the hub with the rim when the jig parts are in interengaging relation. In the presently disclosed embodiment, a collet sleeve 45 is slidable through an aperture in the plate 36, the conical head of the collet being cooperable with a tapered portion of the aperture so that when the collet is drawn downwardly (as viewed in Figure 3) it will be contracted about the axle end 23.

As best seen in Figure 3, the collet 45 is provided with an end 46 which is threaded into one end of a sleeve 47, the opposite end of which receives the threaded extremity of a piston rod 48 which is connected to a piston (not shown) working in a cylinder 49. The cylinder is supported by means of a bracket 50 which is connected to the plate 36.

To further insure accuracy in positionment of the rim and hub portions of the wheel W, two jaws 51, 52 are held to sliding engagement toward and away from the axis of the wheel W. These jaws are slidable in grooves formed in a boss 53. A plate 54 is bolted to span the grooves and this plate holds the jaws against displacement from the grooves. The plate 54 is provided with an inwardly tapering opening terminating in an annular ledge adapted to engage a shoulder portion of the hub and limit inserting movement of the hub, as best seen in Figure 3.

The jaws 51, 52 have connection with a respective one of a pair of rotatable rods 55. 56 each rod having an off-center stud 57 fitting in a bushing 58 received for limited sliding movement in an elongated aperture 59 formed in the respective jaw. It will be appreciated that rotation of the rods 55, 56 will cause sliding movement of the respective jaws.

The rods 55, 56 are respectively connected to levers 60, 61 (see Figures 3 and 4) the free ends of which are connected together by a link 62 which may be of the turnbuckle type to provide for adjustment of the levers 60, 61 relative to each other. The link 62 connects the levers for correlated movement and a spring 63, having one end secured to the link and its other end anchored to the plate 36, normally urges the levers 60, 61 to swing to the right as viewed in Figure 4. In the present embodiment, such movement of the levers urges the jaws 51, 52 inwardly to clamp about a portion of the hub 21. As seen in Figure 5, each jaw has an opening 64 at least a part of which is shaped to correspond to the periphery of the engaged portion of the hub, so that the jaws may clamp about the hub and further assist in properly centering the same. In the present embodiment of the invention, the jaws 51, 52 engage a cone portion of the hub and this assures greater accuracy than if only the axle end 23 is engaged.

The jig part 35 is also formed with means for centering the hub, and as herein shown the central portion of this jig part is formed with a tubular boss 65 for receiving a sleeve collet 66. The collet 66 provides a tapering inner end 67 adapted to cooperate with a complementary tapered surface of the opening through the boss 65 so that as the collet is urged inwardly its end 67 clamps about the axle end 22.

The outer end of the collet 66 is threaded and is screwed into a sleeve 68 (see Figures 3 and 6), the latter having furcations 69 between which is pivoted one end of a link 70. The opposite end of the link 70 is pivoted between furcations 71 of a bell crank lever 72, the latter being swingable about a pin 73 carried by a bracket 74 supported from the jig part 35. The free end of the bell crank lever 72 is pivotally connected to the rod 75 of a fluid cylinder 76, and the cylinder is mounted for swinging movement between ears 77 which extend from one of a pair of cross-plates 80 hereinafter referred to. When the rod 75 is moved to the right (as viewed in Figure 6) the collet 66 will be moved inwardly to clamp about the axle end 22 and thus further center the hub and hold it in proper position relative to the rim.

The jig part 35 is moved to and away from assembled relation with respect to the jig part 34 in manner providing maximum jig opening to facilitate easy insertion and removal of the wheel W. In the present embodiment of the invention, the jig part 35 is secured to the pair of cross-plates 80 (above mentioned) which are suitably braced by means of braces 81. Each pair of ends of the cross-plates 80 are spanned by a bar 81a, and bolted or otherwise secured to each bar 81a is an elongated guide 82 providing an elongated guide portion 83 adapted to ride in a respective track 84.

Each track 84 is of U-shape to receive the respective guide portion 83 and is also of considerable length to provide arms for effecting movement of the jig part 35. The upper ends (with respect to Figures 1 and 2) of the tracks or arms 84 are tied together by a cross-plate 85 which is suitably braced for rigidity. Extending from each track 84 at the upper end is an ear 86, the ears being swingable about a pivot rod 87 carried by a bracket 88 which is supported from the top wall 32 of the base 30. A bracket 89 extends from the tracks 84 and forms a support for a fluid cylinder 90, the piston rod 91 of which extends through the bracket 89 and has its extremity connected to the jig part 35, as shown at 92a in Figure 1.

From the foregoing, it will be appreciated that the jig part 35 may be moved along the tracks 84 by movement of the piston rod 91. The guide portions 83 engage with a considerable length of the tracks 84 in any position of the jig part to prevent binding action of the guide portions in the tracks which may be caused by an off-balancing of the jig part 35. The jig part 35 is shown in cooperating relation with the jig part 34 in Figures 1, 2, 3 and 7, and in separated and retracted relation in dot-dash lines in Figure 9. Comparison of the two positions shown in Figure 9 will reveal the great amount of clearance provided for insertion or removal of the bicycle wheel W with respect to the apparatus.

In addition to being slid along the tracks 84, the jig part 35 is also moved toward and away from the jig part 34 when the former is in position over the latter. In the present embodiment, blocks 92 are bolted or otherwise secured to respective tracks 84 (see Figures 1 and 3) each block having a link 93 pivotally connected thereto. The free end of each link 93 is pivotally connected to one end of a lever 94, each lever being pivotally mounted upon a bracket 95 depending from the plate 36.

A piston rod 96, connected to a piston (not shown) working in a fluid cylinder 97 is pivotally connected, as at 98, to the opposite end of each lever 94. Each fluid cylinder 97 has trunnion mountings 99 (see Figure 1) with a sub-plate 100 spaced from the plate 36. Spacer struts 101 extend between the plate 36 and sub-plate 100 to hold these parts in spaced relation. Only one of the two cylinders 97 is shown in Figure 1 but it will be appreciated that the cylinders in this figure are one behind the other and that their piston rods 96 are connected to respective levers 94.

In operation of the parts thus far described, and assuming that the jig parts 34, 35 are closed on a wheel W, and further assuming that the truing operation on the wheel has been completed, fluid is admitted to the cylinder 97 in proper relation to urge the piston rods 96 downwardly as viewed in Figure 3, thus lifting the jig part 35 from the jig part 34 by swinging the tracks 84 about the pivot 87. Such position is shown by dot-dash lines 84a in Figure 9.

When the jig parts 34, 35 have been thus far separated, fluid is admitted to the cylinder 90 to pull the jig part 35 in an upward direction (as shown in Figure 1) along the tracks 84. The upper position of the jig part 35 is shown by dot-dash lines 35a in Figure 9. Thus the jig part 35 is moved a sufficient distance clear of the jig part 34 to enable an operator to have free and unobstructed access to the jig part 34 during insertion and removal of the wheel W. It will be appreciated that wheel clamping movements will be the reverse of those just described; that is, fluid will be admitted to cylinder 90 to urge the jig part 35 along the tracks 84 to position overlying the jig part 34, and then fluid will be admitted to each of the fluid cylinders 97 to swing the tracks 84 about the pivot 87 and move the jig part 35 into wheel clamping relation with the jig part 34.

After the wheel W, with spokes loosely threaded between rim 20 and hub 21, has been clamped between the jig parts 34, 35, means are provided for tensioning the spokes 24. The tensioning of the spokes in the embodiment disclosed is effected by means engageable with the spoke sleeves 25 and operable to rotate such sleeves to tension the respective spoke a predetermined amount. Preferably, the tensioning of all spokes is carried on substantially simultaneously, and in the present embodiment it is preferred to provide screw-driver arrangements engageable with the slot 28 of the spoke sleeve 25.

As seen in Figure 4, a tensioning device 105 is provided for each spoke 24, and referring to Figure 7 each tensioning device comprises a sleeve 107 which is supported by legs 106, and the sleeve receives a quill 108 which may be slidably moved axially thereof. The quill 108 provides bearing support for a rotatable shaft 109 and, in the present embodiment, the end 110 of the shaft is supported by needle bearings 111 and the opposite end 112 of the shaft is supported by ball bearings 113.

A housing 114 is secured to an enlarged portion 115 of the quill 108 and such housing provides journals for a cross-shaft 116. Pinned to the cross-shaft 116 is a bevel gear 117 which meshes with a bevel gear 118 keyed to the end 112 of the shaft 109. A sleeve 119 holds the cross-shaft 116 to rotation with the end 120 of a flexible shaft construction 121, the opposite end of which is connected to a respective motor 122 (see Figure 1). Preferably, although not essentially, electric motors are used, and in the present embodiment each motor is of 220 volts, 60 cycles, 2 phase, 4 pole low inertial type capable of developing a stalled torque of 30 inch ounces. Each motor, in the present embodiment, is capable of being maintained in stalled, torque-developing condition for some time without injurious effect.

As best seen in Figure 8, the end 110 of the shaft 109 has an enlarged exteriorly threaded portion 123 and a reduced internally threaded portion 124. A sleeve 125 is threaded on the enlarged portion 123 and is formed, at its extremity, with an inturned annular shoulder 126. A nipple 127 is axially slidable within the sleeve and is formed with an annular abutment 128 engageable with the shoulder 126. A spring 129 is disposed between the abutment 128 and a shoulder formed by the enlarged portion 123 and urges the nipple 127 in a direction outwardly of the sleeve 125.

A plug 130 is threaded into the reduced portion 124 of the shaft end 110, the outer extremity of this plug being formed in the shaft of a screw-driver blade 131 which is adapted for disposal within the slot 28 formed in the head 27 of a respective spoke sleeve 25. The plug 130 is centrally bored, as at 132, and counterbored as at 133. A plunger 134 is mounted in the bore 132 for axial reciprocation, and the plunger is formed with a head 135 which limits outward movement thereof. A spring 136 is interposed between the head 135 and an inner wall of the reduced portion 124 and urges the plunger 134 in a direction outwardly of the reduced portion. The bore 132 passes centrally through the screw-driver blade 131 so that the extremity of the plunger 134 may extend beyond the point of the blade.

Each of the tensioning devices 105 is at least in part movable toward and away from the rim 20 for clearance purposes during insertion and removal of the wheel W, and in the present embodiment the quill 108 is advanced and retracted with respect to the stationary sleeve 107 for this purpose. As best seen in Figure 7, each sleeve 107 has a laterally extending collar 137 for receiving a reduced end 138 of a fluid cylinder 139. A nut 140 clamps the cylinder in place by drawing an enlarged portion 141 of the cylinder against the collar 137. The piston rod 142 of the cylinder extends through the nut 140 and is threaded into a lug 143 formed on the housing 114, a jam nut 144 preventing unintentional disassembly.

When fluid under pressure is admitted to the left hand end of the cylinder 139 (as viewed in Figure 7) the pistor rod 142 will be urged to the right, moving the housing 114 to position shown in dot-dash lines and thus retracting the quill 108 and thereby withdrawing the screw-driver blade 131 and related parts sufficiently to clear the side flanges of the rim 20.

When fluid is admitted to the right hand end of the cylinder 139 (also as viewed in Figure 7) the housing 114 and quill 108 are urged to the full line position. With particular reference to Figure 8, the inwardly tapered opening of the nipple 127 engages about the head 27 of the spoke sleeve 25 and the extremity of the plunger 134 enters the opening into the spoke sleeve. Thus, if any minor inaccuracies in alignment occur, the nipple and plunger will provide for proper centering of the screw-driver blade 131. If the blade 131 does not initially seat in the slot 28 formed in the head 27 of the spoke sleeve 25, rotation of the blade 131 will cause it to align with the slot, and overtravel of the piston in the cylinder 139 will seat the blade in the slot.

As may be seen in Figures 1, 2, 4, 7 and 9, a circular guard 104 has been provided to shield the tensioning devices 105. This guard will prevent the operator from becoming injured by the devices 105 and will also shield the devices from dust and the like.

Because the tensioning devices 105 are disposed in a substantially upright plane, as suggested in Figure 1, it is desirable to arrange the fluid cylinders 139 in banks to provide for compensation for any inequalities in movement of the quills 108 and related parts caused by gravity and the like. Bicycle wheels of usual construction are provided with thirty-six spokes and thus thirty-six tensioning devices 105 are provided in the present embodiment.

For practical purposes, the thirty-six fluid cylinders 139 herein shown are divided into three equal banks 147, 148 and 149 (see Figure 10) one bank of cylinders representing the twelve cylinders at the upper portion of the apparatus (as viewed in Figures 1 and 4), the other bank representing the lower twelve cylinders and the third bank representing six cylinders on each side which are intermediate the upper and lower banks.

With reference to Figure 10, fluid from a suitable pressure source enters the main fluid conduit 155 and flows through branches 156, 157 and 158 to valves 159, 160 and 161 which control fluid flow to the cylinder banks 147, 148 and 149 respectively. A pressure control valve 250 is interposed in each branch conduit 156, 157 and 158 so that pressure in each branch may be regulated in accordance with requirements of respective branches and thus cause substantially uniform advance and retraction of the quills 108 and related parts of all tensioning devices. As seen in Figure 10, conduits 162, 163 and 164 lead from respective valves 159, 160 and 161 to one side of the fluid cylinders in the respective banks, and conduits 165, 166 and 167 are connected to the cylinders in respective banks and lead back to the valves 159, 160 and 161 respectively. Each valve has an exhaust conduit communicating with the main exhaust conduit 168 to complete the fluid circuit. In the present embodiment air under pressure is used as the actuating medium although it will be appreciated any other suitable fluid may be used without departing from the invention.

The cycle of operation of the apparatus is set in motion by a pair of push buttons 169 and 170, both of which must be pushed by an operator to start the cycle. Electrical energy is derived from line wires 171, 172 and 173 which lead from a source of suitable electrical supply. In the present embodiment this supply is two phase, 220 volt, 60 cycle. Branch conductors 174 and 175 lead from wires 171 and 172 to switches 176 and 177 which are controlled by the push buttons 169 and 170. The switches 176 and 177 are normally urged, as by springs or the like, to circuit interrupting position and since these switches are connected in series relationship, both push buttons must be depressed.

Contacts of the switch 177 are connected to conductors 178 and 179 which lead to a pressure responsive electrical switch 180 which has pressure connection with the main fluid conduit 155 through a duct 181. The construction is such that the electrical switch 180 is in circuit interrupting relationship unless fluid pressure exists in the conduit 155. The conductors 178 and 179 also lead to terminals of an electrical switch 182, the contactor portion of such switch being urged, as by springs or the like, to position out of engagement with both upper and lower contacts of the switch 182, but being actuated by a plunger 183 which has roller contact with a rotatable cam 184.

With fluid pressure in the main fluid conduit 155, the pressure switch 180 will be closed to pass electrical current to energize a coil 185 of a solenoid construction. Energization of the coil 185 will draw its armature inwardly of the coil and cause closing of all four contacts in a switch 186. Closing of the right hand pair of contacts (as viewed in Figure 10) of the switch 186 will cause energization of a coil 187 of a solenoid whereby the solenoid armature is drawn inwardly of the coil to retract a latch 188. The latch 188 is preferably disposed along one of the tracks 84 in position to engage the respective guide portion 83 to prevent movement of the jig part 35 in a direction to position over the jig part 34 except when the latch 188 is retracted by energization of the coil 187. This is a safety feature which prevents closing movement of the jig part 35 except when electrical energy is available and fluid pressure is in the main conduit 155.

With all contacts of the switch 186 closed, the left hand pair of contacts (again referring to Figure 10) provide for flow of current through conductors 189 and 190 to an electric motor 191 to cause operation of this motor. The conductors 189 and 190 also lead to a solenoid 192 which operates a motor brake. The brake is normally spring pressed to prevent rotation of the motor shaft, but when current flows to the motor 191 the coil of the solenoid is simultaneously energized to move the solenoid armature in a direction to release the brake. When current to the motor 191 is interrupted, the coil of the solenoid will be deenergized and the spring will set the brake and quickly stop rotation of the motor 191. Solenoid brakes of the kind just mentioned are available as commercial products, and since any suitable brake may be used, detail description thereof is believed to be unnecessary.

As seen in Figure 10, the pulley of the motor 191 is connected, by means of a belt or the like, to the pulley of a speed reduction unit 193 which may be of any commercial construction. The output shaft 193a of the unit 193 is arranged to rotate the cam 184 and cams 194 through 202, all cams being rotated simultaneously and at uniform speed by the shaft 193a, the rotation of the cams being in a direction indicated by the arrows. Each of the cams has a cam lobe which is effective during and for a predetermined portion of rotation, and operation of sequence during the operating cycle will be described in the order the cams become effective.

With reference to Figure 10, it will be noted that the cam lobe of the cam 196 is first to become effective upon start of rotation of the shaft 193a. This lobe pushes upwardly on a plunger 203 to change the disposition of ports in a fluid control valve 204 which may be of any commercial construction and which therefore need not be described in detail. With the plunger 203 in upwardly pushed position, certain ports of valve 204 are arranged to provide for flow of pressure fluid from main conduit 155, through the body and ports of valve 204, through branch conduit 205, to the upper or blank end of cylinder 90 and to the upper or rod end of cylinder 49. Also, certain other ports of valve 204 are arranged so that fluid exhausted from the lower or rod end of cylinder 90 and from the lower or blank end of cylinder 49 may pass through a branch conduit 206, through the body and ports of valve 204, through branch conduit 207, and to exhaust conduit 168.

Thus, the piston in cylinder 49 will be urged in a direction to cause clamping of the collet sleeve 45 about the axle end 23 of wheel W positioned in jig part 34, and the piston in the cylinder 90 will be urged in a direction to cause movement of the jig part 35 along the tracks 84 to position overlying the jig part 34, the latter movement being possible only if the latch 188 is retracted as before explained.

With the plunger 203 off of the lobe of cam 196, as in the position shown in Figure 10, the ports of valve 204 will be reversed from position just described so that fluid pressure is delivered through branch conduit 206 to the rod end of cylinder 90 and to the blank end of cylinder 49, thus effecting unclamping of the axle end 23 and retraction of the jig part 35 along the tracks 84. This reversal of operation, it will be appreciated, is caused at the proper time during a later portion of the operating cycle. Suitable speed control valves 208, 209 may be disposed in respective branch conduits 205, 206 adjacent to cylinder 90 to provide for variation in the speed of movement of jig part 35 along tracks 84.

As a further precautionary feature, plunger-operated valves 210 and 211 are disposed in respective branch conduits 205, 206, the plungers of respective valves being cooperable with the tracks or arms 84 so that fluid is permitted to flow through conduits 205, 206 and to and from cylinder 90 only when the arms 84 are in raised position, such as is shown in dot-dash lines in Figure 9. In other words, in the event of failure of any part of the apparatus which would cause the arms 84 to drop prior to the time the jig part 35 is disposed in position overlying the jig part 34, the valves 210, 211 would be actuated to prevent flow of fluid to and from the cylinder 90.

From the foregoing, it will be appreciated that with the wheel W in proper position in the die, and with fluid pressure in the system and with the buttons 169, 170 depressed, the operation thus far described will cause the collect sleeve 45 to clamp the axle end 23 and will also cause the jig part 35 to move along tracks 84 to position overlying the jig part 34.

Shortly after the lobe of cam 196 engages plunger 203 of valve 204, a plunger 212 drops off of the lobe of cam 198 to change disposition of ports in a valve 213 so as to interrupt fluid flow from the main conduit 155 through a branch conduit 214 to the rod end of a single acting cylinder 215. The piston rod 216 of the cylinder 215 is connected to the lever 60 (see also Figure 4) and interruption of fluid pressure to the rod end of the cylinder will permit the spring 63 to act on the levers 60, 61 to clamp the jaws 51, 52 about the cone portion of the hub. At a later time in the cycle of operation, the plunger 212 will again engage the lobe of cam 198 to change disposition of ports in valve 213 so that fluid is provided through conduit 214 to the rod end of cylinder 215 so that the piston rod 216 will swing levers 60, 61 against the action of spring 63 and withdraw jaws 51, 52 from clamping engagement with the hub of wheel W. It will be appreciated that such unclamping action will take place just prior to the time the wheel W is to be removed from the apparatus.

After the jaws 51, 52 have been clamped about the hub of the wheel W, a plunger 217 of a valve 218 drops off of the lobe of cam 197 so as to change disposition of ports in valve 218 and provide for flow of fluid from main conduit 155 through branch conduit 219 to the blank end of the two cylinders 97, whereby the rods are urged outwardly of respective cylinders and push upwardly on respective ends of levers 94 (see Figure 3), whereby a downward pull is exerted on respective links 93, thus causing the tracks or arms 84 to swing about their pivot 87 and move jig part 35 toward and into wheel clamping engagement with jig part 34. A branch conduit 220 leads from the rod end of cylinders 97 back to valve 218 to complete the fluid circuit to the exhaust conduit 168.

As a precautionary measure, a plunger-operated valve 221 is inserted in branch conduit 219, the plunger 222 of this valve being engageable by the jig part 35 when the latter has reached proper extended position along the tracks 84 and is in accurate alignment with jig part 34. Thus, when jig part 35 has not reached accurate alignment with jig part 34, the valve 221 will prevent closing action of the jig part 35 and thereby prevent damage to the apparatus.

During a later portion of the cycle, and when the wheel W has been properly trued and spokes properly tensioned, the lobe of cam 197 will again engage plunger 217 of valve 218 and reverse the ports of this valve so that the rods 96 of respective cylinders 97 will move in an opposite direction and effect wheel unclamping movement of the jig part 35.

After the jig part 35 has been moved to wheel clamping relation with the jig part 34, the plunger 223a of a valve 223 drops off of cam 199 to change the disposition of ports of this valve and provide for flow of fluid from the main conduit 155, through branch conduit 224 to the rod end of cylinder 76, whereby the piston rod is drawn inwardly of the cylinder and causes swinging action of the bell-crank lever 72 (see Figures 2 and 6) to cause sleeve collet 66 to clamp about the axle end 22 and thereby complete clamping action of the wheel W. A branch conduit 225 leads from the blank end of cylinder 76 back to valve 223 to complete the fluid circuit to the exhaust conduit 168. During a later portion of the cycle, and when the wheel W has been properly trued and spokes properly tensioned, the lobe of cam 199 again engages with plunger 223a of valve 223 to reverse the ports of this valve so that the sleeve collet 66 is moved to release the axle end 22.

As herein disclosed, just about the time the cam 199 operates to effect clamping of the collet sleeve 66 about the axle end 22, the cams 194, 184, 200, 201 and 202 engage with plungers 230, 183, 231, 232 and 233 respectively. The plunger 230 is connected to the contactor portion of an electrical switch 226 which is similar to the switch 182 in that it has spaced pairs of upper and lower contacts, with the contactor portion spring-pressed or otherwise normally urged out of engagement with respective pair of contacts.

The lobes of cams 194 and 184 engage with respective plungers 230 and 183 at substantially the same time, the plunger 183 causing bridging of the pairs of contacts in switch 182 so that current will flow from line wires 171, 172 through branch conductors 227, 228 respectively, through the bridged pairs of contacts in switch 182, through branch conductors 178, 179 to pressure switch 180. In this position of parts, the circuit through the push-buttons 169 and 170 is by-passed and the operator may remove pressure from such push-buttons since the closed switch 182 will now hold the circuit formerly made by the push-button switches 176, 177.

The plunger 230, when it is contacted by the lobe of cam 194, causes bridging of the pairs of contacts in switch 226 so that current from conductors 227, 228 flows through branch conductors 231, 232 to a coil 233 of a solenoid. Energization of the coil 233 causes it to shift its armature to the right, as viewed in Figure 10, to cause all four pairs of contacts in a switch 234 to be bridged. The two left hand pairs of contacts are connected to line wires 172, 173 by means of branch conductors 235, 236 and are also connected to one side of each of the electric motors 122 by means of branch conductors 237, 238. One of the remaining pairs of contacts of switch 234, when bridged, is connected to the opposite side of each of the electric motors 122 by means of a branch conductor 239, and is also connected to line wire 171. The remaining pair of contacts of switch 234 (on the extreme right hand of this switch as shown in Figure 10), when bridged, is connected to a conductor 240 which connects to line wire 172, and such pair of contacts is also connected, by branch conductor 241 to one of the upper pair of contacts in a switch 242, a resistance 243 of predetermined value being interposed in conductor 241. The other of the upper pair of contacts of switch 242 is connected to a lower one of a pair of contacts and is also connected by branch conductor 244 to the opposite side of the electric motors 122. In each case, a variable resistance 245 is interposed in the connection of conductor 244 with the respective motor 122 whereby adjustment of individual motors is possible.

The contactor portion of switch 242 is normally urged to bridging engagement with the upper pairs of contacts of this switch so that the motors 122 are caused to operate, when contacts of switches 226 and 182 are bridged, on current of a predetermined value as determined by the value of the resistance 243, and such motors are designed to develop a predetermined torque at such current value.

At about the time the lobes of cams 194 and 184 engage their respective plungers, the lobes of cams 200, 201 and 202 engage plungers 231, 232 and 233 respectively, each plunger causing a change in port disposition of respective valves 159, 160 and 161 so that fluid under pressure from the main pressure conduit 155 is caused to flow through respective branch conduits 156, 157, 158 and respective branch conduits 162, 163, 164, to the rod end of all of the cylinders 139 in the banks 147, 148 and 149. It will be noted that the regulating valves 250 are interposed in the branch conduits 156, 157, 158 to provide for adjustment of fluid flow to respective cylinder banks. With fluid under pressure flowing to the cylinders 139, the quill 108 of each tensioning device 105 is moved in a direction to engage with the head 26 of a respective spoke sleeve 25, and since the screw driver blades 131 are being rotated at about the time of movement of the quills, such blades will readily seat in the slots 28 formed in heads 26 of respective spoke sleeves 25 and each spoke sleeve will be rotated to tension the respective spoke in accordance with the low torque operation of the motors 122.

After the spoke sleeves of respective spokes have been rotated a predetermined amount through action heretofore described, the lobe of cam 195 engages its corresponding plunger 251 to shift the contactor portion of switch 242 away from bridging relation with the upper pair of contacts and to bridging relation with the lower pair of contacts. In such relation, one of the lower pair of contacts will still be connected to one side of the motors 122 through conductor 244. However, the other of the lower pair of contacts will be connected to a branch conductor 253 which connects with conductor 241 to cut out resistance 243. With this resistance cut out, the motors 122 will operate at a higher torque and will tension respective spokes to such higher torque.

As is evident from inspection of the lobe of cam 195 as shown in Figure 10, operation of the motors 122 at high torque is only for a fraction of the operating cycle and plungers 230 and 251 drop off of respective cams 194 and 195 at about the same time, such action of the lobe of cam 194 causing deenergization of solenoid coil 233 so that the armature of the solenoid may be urged, by springs or other suitable means, to position shown in Figure 10 wherein the bridging engagement of contacts of switch 234 is broken, thus interrupting flow of current to the motors 122.

Preferably, although not necessarily, just prior to the time the motors 122 are deenergized, the lobes of cams 200, 201 and 202 are moved from engagement with respective plungers 231, 232 and 233 so that the disposition of valve ports of respective valves 159, 160 and 161 is changed to cause fluid under pressure to flow from main conduit 155, through respective branch conduits 156, 157 158, through respective branch conduits 165, 166, 167, to the blank end of all cylinders 139 in the banks 147, 148, 149, the exhaust from such cylinders passing through conduits 162, 163, 164 to respective valves 159, 160, 161 and to the exhaust conduit 168. Such disposition of parts will cause the quill 108 of each tensioning device 105 to be retracted from engagement with respective spoke sleeves, retraction being sufficient to clear any portion of the rim 20 of the wheel W.

Preferably just after the tensioning devices 105 have been moved to retracted position, the plunger 223a drops off of the lobe of cam 199 so as to change disposition of ports in valve 223 whereby fluid under pressure is caused to flow from main conduit 155 to the blank end of cylinder 76 to effect unclamping action of the collet sleeve 66 with respect to the axle end 22. Preferably shortly thereafter, plunger 212 drops off of the lobe of cam 198 so as to change disposition of ports in valve 213 whereby fluid under pressure is caused to flow from main conduit 155 to the rod end of cylinder 215 so as to pull against pressure of the spring 63 and cause swinging action of levers 60, 61 to the left (as viewed in Figure 4) to cause unclamping movement of the jaws 51, 52 and release the cone portion of hub 21 of wheel W.

Thereafter, plunger 217 is engaged by the lobe of cam 197 and is urged to change disposition of ports in valve 218 so that fluid under pressure is caused to flow from main conduit 155 to the rod end of each of the cylinders 97, whereby the cylinder rods 96 are pushed downwardly (Figure 3) to pivot levers 94 to effect swinging movement of tracks 84 about the pivot 87 and cause separating movement of the jig part 35 with respect to the jig part 34.

Thereafter, plunger 203 drops off of the lobe of cam 196 to change disposition of ports in valve 204 so that fluid under pressure is caused to flow from main conduit 155 to the blank end of cylinder 49 to effect unclamping action of the collet sleeve 45 with respect to the axle end 23. The valve, in this position of ports, will also cause fluid under pressure to flow from the main conduit 155 to the rod end of cylinder 90 so that the jig part 35 is retracted along tracks 84 to position shown in dot-dash lines in Figure 9 to provide for easy access to the jig part 34 for the purpose of removing the wheel W.

As a final step in the cycle, the plunger 183 will drop off of the lobe of cam 184 so that the contactor of switch 182 will be moved to disengaged relation with the switch contacts whereby current to the solenoid coil 185 is interrupted, thus causing the armature of this solenoid to be pulled to left (as viewed in Figure 10) by means of springs or other suitable means, to effect unbridging of the contacts in switch 186 and interruption of current flow to the motor 191 and motor brake solenoid 192. As before pointed out, the motor brake will immediately actuate to prevent over-travel of the motor 191.

The machine is now at rest, and a completed wheel W may be removed and another uncompleted wheel may be inserted into jig part 34. Thereafter, to start another cycle, an operator need only press on the push-buttons 169, 170 and the apparatus will immediately be set into motion to complete a cycle in the manner hereinbefore described.

My invention provides means for mass producing finished wheels of uniform trueness and with accuracy held to close tolerances. For example, the jaws 51, 52 are provided to insure greater accuracy in the final product since they engage and position a part of the hub which was machined at the same time the ball race of the hub was machined and therefore is concentric with the ball race. This is a desirable feature since mass-produced commercial bearings commonly used in bicycle wheels often do not revolve on the geometrical center of the axle, but with the wheel trued in accordance with my invention, bearing inaccuracies, or inaccuracies in the axle and axle bearing cones do not affect the accuracy with which a wheel may be trued.

Despite care used in the manufacture of wheel rims, it has been found that such rims vary as to trueness, and this probably is caused by slight variance in metal tempers and/or careless handling and storage. However, difficulties previously encountered are overcome through use of my invention since the complementing surfaces of jig parts 34, 35 are accurately machined to provide a jig cavity defined by surfaces which are true with respect to the clamping means for the hub. Thus, if a wheel rim is slightly eccentric or if it is out of true planar relation, the wheel rim will be forced to trueness when it is clamped between the jib parts 34, 35. Further accuracy is insured by the fact that both collets 45 and 66 are arranged to grip respective axle ends as such collets are forced in a direction toward the supporting plate 36, thus insuring that the hub will be positively moved to engagement with the prepositioned stop formed by the plate 54.

Greater wheel accuracy is also attained by the fact that all spokes are first tensioned to a predetermined low tension and thereafter are tensioned to a predetermined higher tension. The predetermined low tension may be of an amount equal to that which may be applied by rotation of the spoke sleeves 25 by finger pressure, or it may be higher than such amount. In any event, it is preferable to first tension all spokes to a predetermined low tension to insure that all slack in the spokes has been taken up before the final tension is applied.

In use of prior methods, it has been found that a wheel had been passed as true with spokes tensioned to different degrees and this is understandable since excessive tension on certain spokes may be off-set by like tension on certain other spokes. However, it will be appreciated that this unbalanced condition of tension with respect to all of the spokes is undesirable in that relief of stresses caused by time or usage will quickly throw the wheel out of true. Such conditions will not prevail in wheels which have spokes uniformily tensioned by use of my invention.

It will be appreciated that the foregoing description is directed to one embodiment of the invention and that modifications may be made without departing from the spirit of the invention. For example, the tensioning devices 105 may be constructed to engage the spoke sleeves at portions interiorly of the rim 20 instead of at the headed screw-driver slots previously described. In such case, a rotatable member would be provided for engagement with each spoke sleeve, each rotatable member being driven by a movable operator which may take the form of a piston rod or an extension thereof. For example, in usual bicycle wheel construction, each of the spoke sleeves 25 is provided with opposed flat portions and a modified device may employ open-end wrenches which engage the flat portions of each spoke sleeve and which are rotatable through use of suitable motive means to effect tensioning of the respective spoke.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

Apparatus for operation on a wheel having a rim, a hub and a plurality of spokes generally loosely connecting the rim and hub, each spoke having a rotatable sleeve threaded thereon and extending through said rim and terminating in a portion having a screw-driver slot, comprising: wheel holding means; tensioning means for each spoke, each including a rotatable screw-driver blade and an electric motor for rotating said blade; means for moving said tensioning means into operable engagement with respective spokes wherein said screw-driver blades are engageable within respective screw-driver slots; resistance means in the power line of each electric motor to effect a first torque to tension said spokes a first amount, and means to shunt out said resistance to effect a higher torque to tension said spokes a greater amount.

References Cited in the file of this patent

UNITED STATES PATENTS

| | | |
|---|---|---|
| 569,888 | Sanderson | Oct. 20, 1896 |
| 610,652 | Hurst et al. | Sept. 13, 1898 |
| 1,920,592 | Peters | Aug. 1, 1933 |
| 1,944,596 | Farr et al. | Jan. 23, 1934 |
| 1,980,129 | Eksergian et al. | Nov. 6, 1934 |
| 2,065,644 | Bristol | Dec. 29, 1936 |
| 2,090,838 | Gustafson | Aug. 24, 1937 |
| 2,170,848 | Bennett | Aug. 29, 1939 |
| 2,422,593 | Smith | June 17, 1947 |
| 2,530,572 | Eckles | Nov. 21, 1950 |
| 2,533,113 | Henry | Dec. 5, 1950 |
| 2,536,317 | Shakesby | Jan. 2, 1951 |
| 2,607,402 | Meydrech | Aug. 19, 1952 |
| 2,633,907 | Douglas | Apr. 7, 1953 |

FOREIGN PATENTS

| | | |
|---|---|---|
| 322,214 | Great Britain | Dec. 2, 1929 |
| 634,997 | Great Britain | Mar. 29, 1950 |